US011268370B2

(12) United States Patent
Quattrone et al.

(10) Patent No.: US 11,268,370 B2
(45) Date of Patent: Mar. 8, 2022

(54) MODEL-BASED PARAMETER ESTIMATION FOR DIRECTIONAL DRILLING IN WELLBORE OPERATIONS

(71) Applicants: Francesco Quattrone, Hannover (DE); Christian Hansen, Hambuehren (DE); Oliver Hoehn, Hannover (DE); Joern Koeneke, Burgdorf (DE); Bruno Morabito, Reggio Calabria (IT); Rolf Findeisen, Stuttgart (DE)

(72) Inventors: Francesco Quattrone, Hannover (DE); Christian Hansen, Hambuehren (DE); Oliver Hoehn, Hannover (DE); Joern Koeneke, Burgdorf (DE); Bruno Morabito, Reggio Calabria (IT); Rolf Findeisen, Stuttgart (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 537 days.

(21) Appl. No.: 15/935,659

(22) Filed: Mar. 26, 2018

(65) Prior Publication Data

US 2019/0292898 A1   Sep. 26, 2019

(51) Int. Cl.
*G05B 13/04* (2006.01)
*G05B 13/02* (2006.01)
(Continued)

(52) U.S. Cl.
CPC ............... *E21B 44/04* (2013.01); *E21B 7/04* (2013.01); *E21B 44/06* (2013.01); *E21B 45/00* (2013.01);
(Continued)

(58) Field of Classification Search
CPC . E21B 44/04; E21B 7/04; E21B 44/06; E21B 45/00; E21B 47/04; E21B 49/003; G05B 13/0265; G05B 13/042
(Continued)

(56) References Cited

U.S. PATENT DOCUMENTS

| 8,014,987 B2 * | 9/2011 | Pabon ...................... E21B 44/00 |
| | | 703/10 |
| 9,605,480 B2 | 3/2017 | Ignova et al. |

(Continued)

FOREIGN PATENT DOCUMENTS

| RU | 2461707 C2 | 9/2012 |
| RU | 2471980 C2 | 1/2013 |

(Continued)

OTHER PUBLICATIONS

International Search Report and the written Opinion of the International Searching Authority, or the Declaration; PCT/US2019/023874; dated Jul. 9, 2019; 9 pages.

(Continued)

*Primary Examiner* — Kamini S Shah
*Assistant Examiner* — Faraj Ayoub
(74) *Attorney, Agent, or Firm* — Cantor Colburn LLP

(57) ABSTRACT

Examples of techniques for model-based parameter and state estimation for directional drilling in a wellbore operation are provided. In one example implementation according to aspects of the present disclosure, a computer-implemented method includes receiving, by a processing device, measurement data from the wellbore operation. The method further includes performing, by the processing device, an online estimation of at least one of a parameter to generate an estimated parameter and a state to generate an estimated state, the online estimation based at least in part on the measurement data. The method further includes generating, (Continued)

by the processing device, a control input to control an aspect in the wellbore operation based at least in part on the at least one of the estimated parameter and the estimated state. The method further includes executing a control action based on the control input to control the aspect of the wellbore operation.

23 Claims, 13 Drawing Sheets

(51) Int. Cl.
   E21B 49/00    (2006.01)
   E21B 45/00    (2006.01)
   E21B 7/04     (2006.01)
   E21B 44/04    (2006.01)
   E21B 47/04    (2012.01)
   E21B 44/06    (2006.01)

(52) U.S. Cl.
   CPC ............ *E21B 47/04* (2013.01); *E21B 49/003* (2013.01); *G05B 13/0265* (2013.01); *G05B 13/042* (2013.01)

(58) Field of Classification Search
   USPC ............................................. 703/10
   See application file for complete search history.

(56) References Cited

U.S. PATENT DOCUMENTS

| | | | |
|---|---|---|---|
| 2012/0010865 A1* | 1/2012 | Benson | G01V 11/00 703/10 |
| 2013/0124176 A1 | 5/2013 | Fox et al. | |
| 2014/0351183 A1 | 11/2014 | Germain et al. | |
| 2015/0218914 A1* | 8/2015 | Marx | E21B 41/0092 175/24 |
| 2015/0226049 A1* | 8/2015 | Frangos | E21B 49/00 702/6 |
| 2015/0356403 A1 | 12/2015 | Storm, Jr. | |
| 2015/0361725 A1* | 12/2015 | Ignova | E21B 49/003 175/27 |
| 2016/0290118 A1* | 10/2016 | Xue | E21B 47/12 |
| 2017/0235284 A1 | 8/2017 | Watson | |
| 2020/0248540 A1* | 8/2020 | Madasu | G06N 3/04 |

FOREIGN PATENT DOCUMENTS

| | | |
|---|---|---|
| RU | 2588526 C2 | 4/2016 |
| WO | 2016108897 A1 | 7/2016 |
| WO | WO-2017023541 A1 * | 2/2017 ......... G05B 19/0425 |

OTHER PUBLICATIONS

Luc Pemeder, "A Three-Dimensional Mathematical Model of Directional Drilling", 2013, University of Minnesota, 143 pages.
M. Neubert, G. Heisig; Advanced Trajectory Simulation of Directional Wellbores; Conference: Energy week 1997 conference & exhibition, Houston, TX; 1997; 9 pages.
M. Neubert, Zur Entstehung spiralförmiger Bohrlöcher; Bericht Jan. 1993; Institut für Technische Mechanik, TU Braunschweig; 33 pages.
M. Neubert; On the Generation of Spiral Boreholes, No. 1 /1993; Institute for Technical Engineering Technische Universität Braunschweig; pp. 1-37.
Ho, H. S. "Prediction of drilling trajectory in directional wells via a new rock-bit interaction model." SPE Annual Technical Conference and Exhibition. Society of Petroleum Engineers, 1987, 13 pgs.
Russian Office Action Issued in Russian Application No. 2020 132 285 dated Feb. 10, 2021.

* cited by examiner

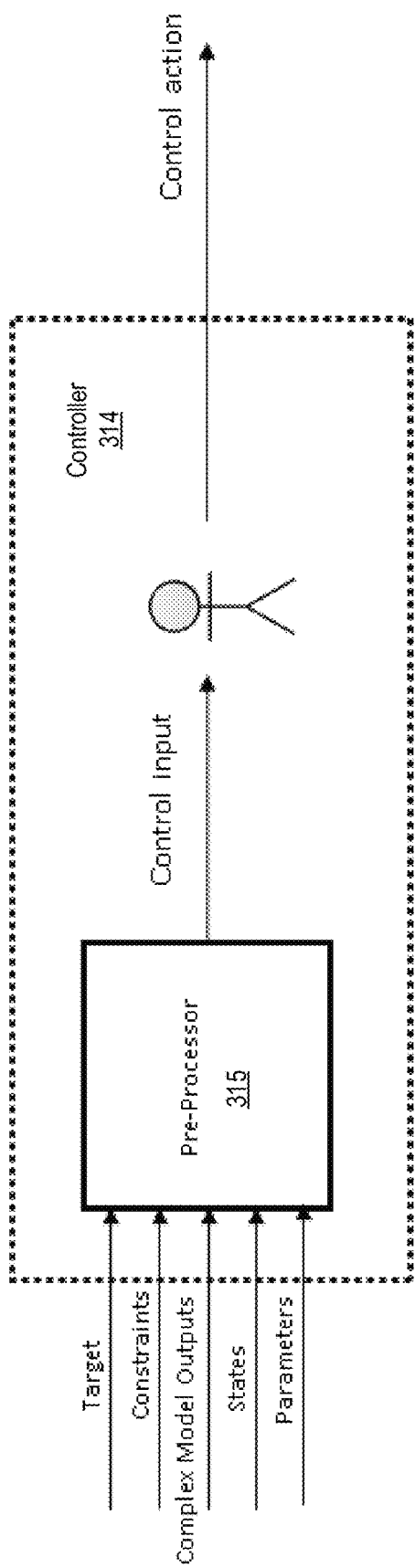
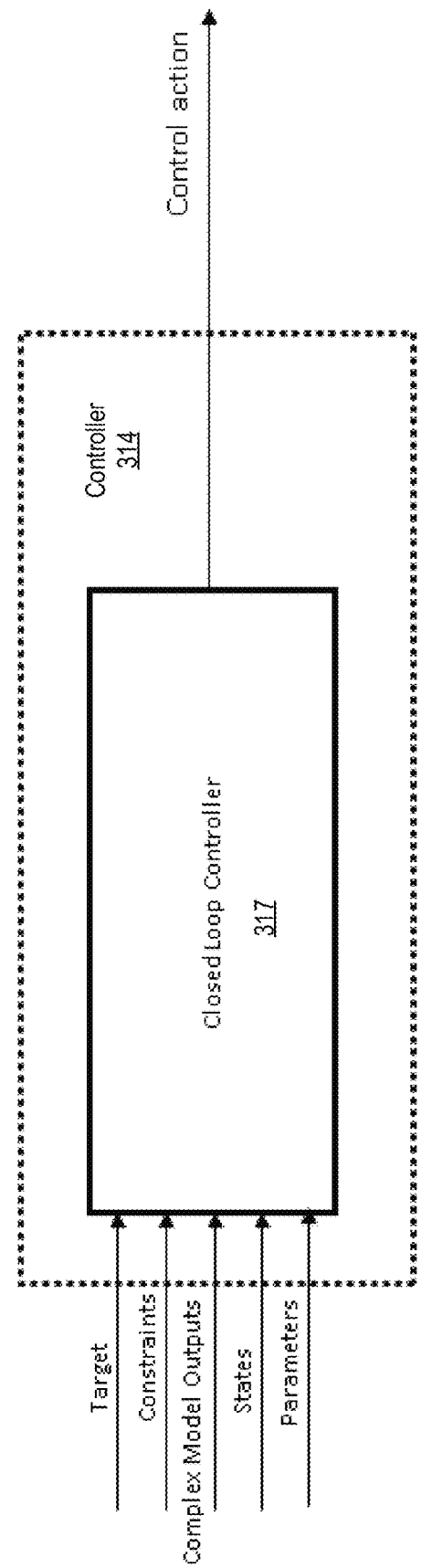

MODEL-BASED PARAMETER ESTIMATION FOR DIRECTIONAL DRILLING IN WELLBORE OPERATIONS

BACKGROUND

Embodiments described herein relate generally to downhole exploration and production efforts and more particularly to techniques for model-based parameter estimation for directional drilling in wellbore operations.

Downhole exploration and production efforts involve the deployment of a variety of sensors and tools. The sensors provide information about the downhole environment, for example, by providing measurements of temperature, density, and resistivity, among many other parameters. Other tools can be at the surface, for example, such as top drive or pumps. This information can be used to control aspects of drilling and tools or systems located in the bottomhole assembly, along the drillstring, or on the surface.

SUMMARY

According to one embodiment of the invention, a computer-implemented method for model-based parameter and state estimation for directional drilling in a wellbore operation is provided. The method includes receiving, by a processing device, measurement data from the wellbore operation. The method further includes performing, by the processing device, an online estimation of at least one of a parameter to generate an estimated parameter and a state to generate an estimated state, the online estimation based at least in part on the measurement data. The method further includes generating, by the processing device, a control input to control an aspect in the wellbore operation based at least in part on the at least one of the estimated parameter and the estimated state. The method further includes executing a control action based on the control input to control the aspect of the wellbore operation.

According to another embodiment of the present disclosure, a system for model-based parameter estimation for directional drilling in wellbore operations is provided. The system includes a memory comprising computer readable instructions, and a processing device for executing the computer readable instructions for performing a method. The method includes receiving, by the processing device, measurement data from the wellbore operation. The method further includes performing, by the processing device, an online estimation to estimate at least one of a parameter and a state based at least in part on measurement data and based at least in part on an offline estimation. The method further includes implementing, by the processing device, a control input to control an aspect of the wellbore operation, wherein the control input is based at least in part on the estimated parameter and the estimated state.

BRIEF DESCRIPTION OF THE DRAWINGS

Referring now to the drawings wherein like elements are numbered alike in the several figures:

FIG. 3B depicts a block diagram of an example of the controller of FIG. 3A according to aspects of the present disclosure;

FIG. 3C depicts a block diagram of another example of the controller of FIG. 3A according to aspects of the present disclosure;

DETAILED DESCRIPTION

Figure 1:
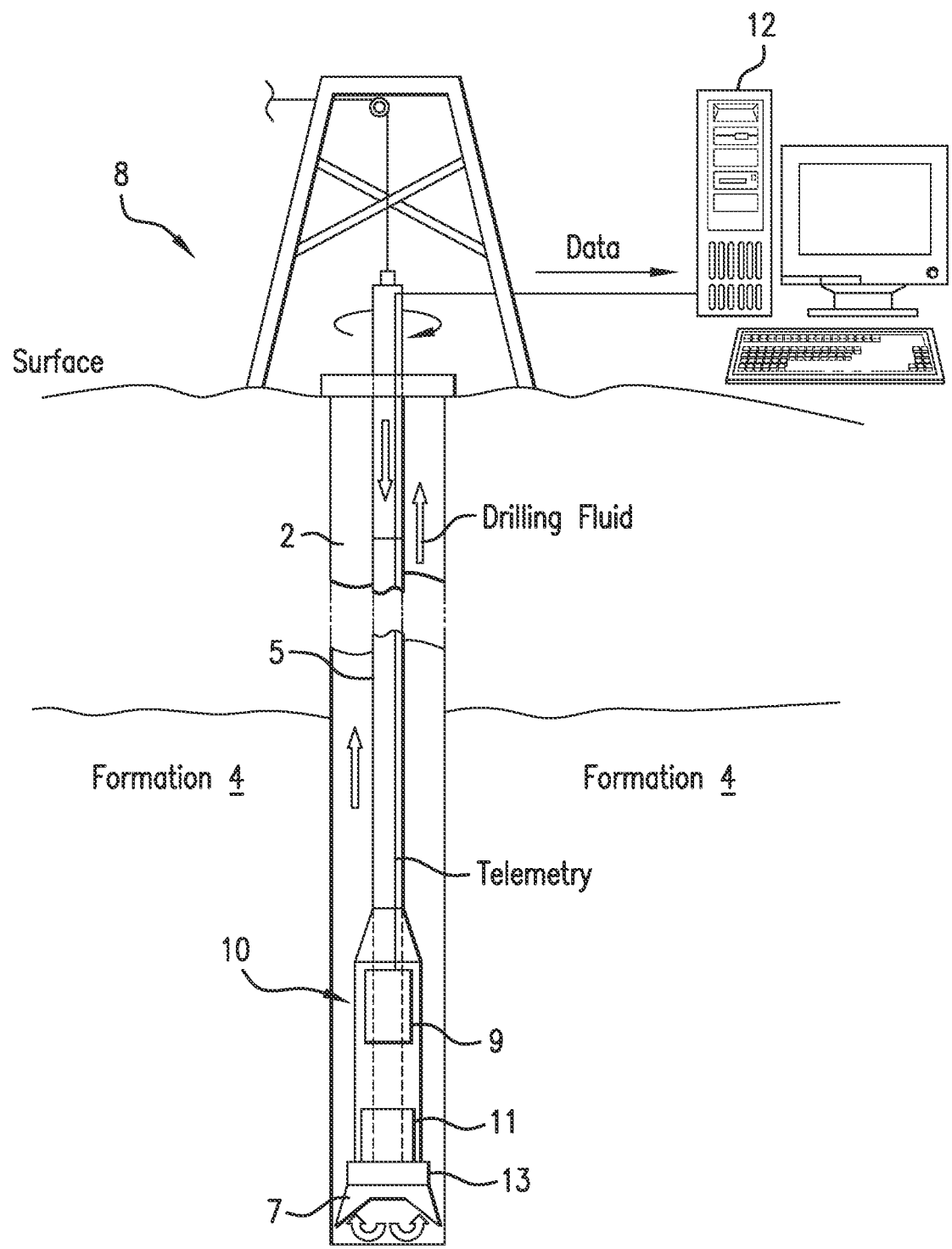
FIG. 1 depicts a cross-sectional view of a downhole system according to aspects of the present disclosure.

The present techniques relate to model-based parameter estimation for directional drilling in wellbore operations. This increases efficiency and consistency and provides automation of drilling services at the wellbore operation.

BHA-rock interaction (i.e., the interaction between a drill bit of a drill in a wellbore operation and an earth formation) may not currently be fully utilized for the computation of the control action for a directional drilling job. Consequently, steering control for directional drilling systems works sub-optimal. This can cause difficulties steering along a pre-defined well path and achieving consistent wellbore quality. BHA-rock interaction depends on the earth formation and on the drill bit type. In practice, unverified fudge factors are used to describe the influence of the earth formation on the steerability of a bottom hole assembly (BHA). Models of BHA-rock interaction are available, but it is difficult to know the parameters in advance since the exact bit-type information and earth formation characteristics are not known. Furthermore, the bit characteristics can change during the drilling operation due to bit wear.

Considering the BHA-rock interaction and the BHA models improves determining which control action to select and in conjunction with a drill ahead model, it enables the development of virtual sensors. By estimating unknown forces acting on the bit and other model parameters, it is possible to adjust steering forces, weight on bit (WOB), etc., in an optimum way to e.g. follow a predefined well plan. The present disclosure provides techniques describing how to use a model-based learning approach to estimate the parameters of the model. These parameters may change together with the formation. Therefore, an abrupt change of the estimated parameters can be exploited for determining a formation change event.

When drilling multiple wells in the same geographic area, earth formations can be determined from data collected from offset wells. The data collected from the offset wells can be used to estimate the BHA-rock interaction parameters, if the same BHA and a similar bit are used. BHA-rock interaction is the exchange of forces and moments at the contact points of BHA and rock considering the cutting characteristics of the bit. Regression or machine learning techniques can be used in the estimation, where machine learning is a type of artificial intelligence that enables computing devices to learn without being explicitly programmed. In particular, the present disclosure utilizes online parameters estimation and offline machine learning to match BHA-rock interaction models with the actual drilling situation. The term "online" reflects the condition of being connected to the wellbore operation 301, meaning that the algorithm is solved each time when at least a new measurement (or a new piece of information) becomes available or when the control action needs to be updated. The term "offline" refers to the fact that the algorithm is solved only after collecting a certain amount of measurements or data.

The present techniques provide many advantages, including, for example: adaptive parameter identification for BHA and BHA-rock interaction as a basis to compute, in real-time, the optimal control action in directional drilling; automated "online" and "offline" parameter estimation using real-time data and offset well data; real-time estimation of states and parameters; fast "online" estimation using a simplified model; utilization of past (historical) measurement data to estimate parameters; and reduction of noise that is superimposed on the measurement data. The present techniques can be utilized in a variety of different ways, including, for example: automated calculation of steer forces and steer direction to realize a desired build rate and turn rate considering BHA and BHA-rock interaction; detection of formation changes; prediction of a well path; and virtual sensors.

Embodiments of the present disclosure are based on modeling the BHA-rock interaction and the BHA. In general, the model can be a physical model or a data driven model. Furthermore, the model can be dynamic or static. Dynamic models describe the change in time (or depth) of certain variables characterizing the BHA. These variables are referred to as "states." Such dynamic models can be represented mathematically a "state-space form" as follows:

$$\dot{x}(t)=f(x(t),u(t),p(t),t),$$

where (˙) denotes the time (or depth) derivative, x(t) represents the vector of time-varying states, u(t) represents the vector of inputs, p(t) represents the vector of parameters, f(•) represents the set of equations describing the model dynamics, and t represents time. The parameters are usually considered to be constant or to change slowly in time, but if they do change in time, a model may not be available for describing their dynamics.

Static models do not describe the dynamics but instead correlate, classify, and predict the output of a system given some set of measurements as input referred to as features. A static model is represented by the following notation:

$$h_\theta(z)=0,$$

where z represents the vector of features and $(\bullet)_\theta$ indicates that the hypothesis h is function of a vector of parameters $\theta$ which generally is of higher dimension with respect to the vector p of the dynamic model. Machine learning approaches can use static model $h_\theta(z)$ with no or little insight into the physics behind the system under consideration. The goal is to use, when available, first-principle models as hypothesis function. When such models are not available, $h_\theta(z)$ represents a data-driven model (e.g., neural network).

The dynamic and static models each depend on parameters that, most of the time, are impossible to know a priory with sufficient accuracy. Therefore, it is useful to estimate these parameters in order to reliably use the model for system control purpose. This problem is called the parameter identification problem.

The accuracy of the model is also important for obtaining correct prediction of the physical system. In some situations, accuracy is proportional to its complexity, which in turn is proportional to the amount of computational time needed for solving the model. Accordingly, a trade-off between complexity and computational time may be needed.

According to aspects of the present disclosure, the online estimator has connectivity to real-time measurements from the drilling system. In some cases, an online estimation technique has a maximum computational time that is shorter than the time between two consecutive control actions in the wellbore operation. In this case, a controller can use the online estimation results in order to compute the next control action. On the contrary, according to some examples, an offline estimation technique has a computational time that is larger than the online estimation technique and therefore may not be able to be used in between each application of the control action. In some implementations, the offline estimation can always collect measurement from the drilling system and perform the computation when it is triggered by an event.

Online estimation techniques often use a simplified model that can give a faster (but usually not precise) solution. Offline estimation techniques, which may not have as restrictive time constraints as online estimation techniques, can use a more complex model and process a much higher amount of input data to provide a more precise solution.

The present techniques describe a combination of an online estimation with an offline machine learning estimation component to estimate state and parameters. The online estimation uses a simplified model and smaller set of measurement data while the offline estimation uses a more complex model and a larger set of measurement data. The online estimation is used from a control algorithm in order to compute, in real-time, an optimal control action(s) to perform on the BHA. The offline estimation can be used to identify the parameters of a more complex model which uses parameters not considered by the online estimation and to adjust the online estimation.

Figure 2:
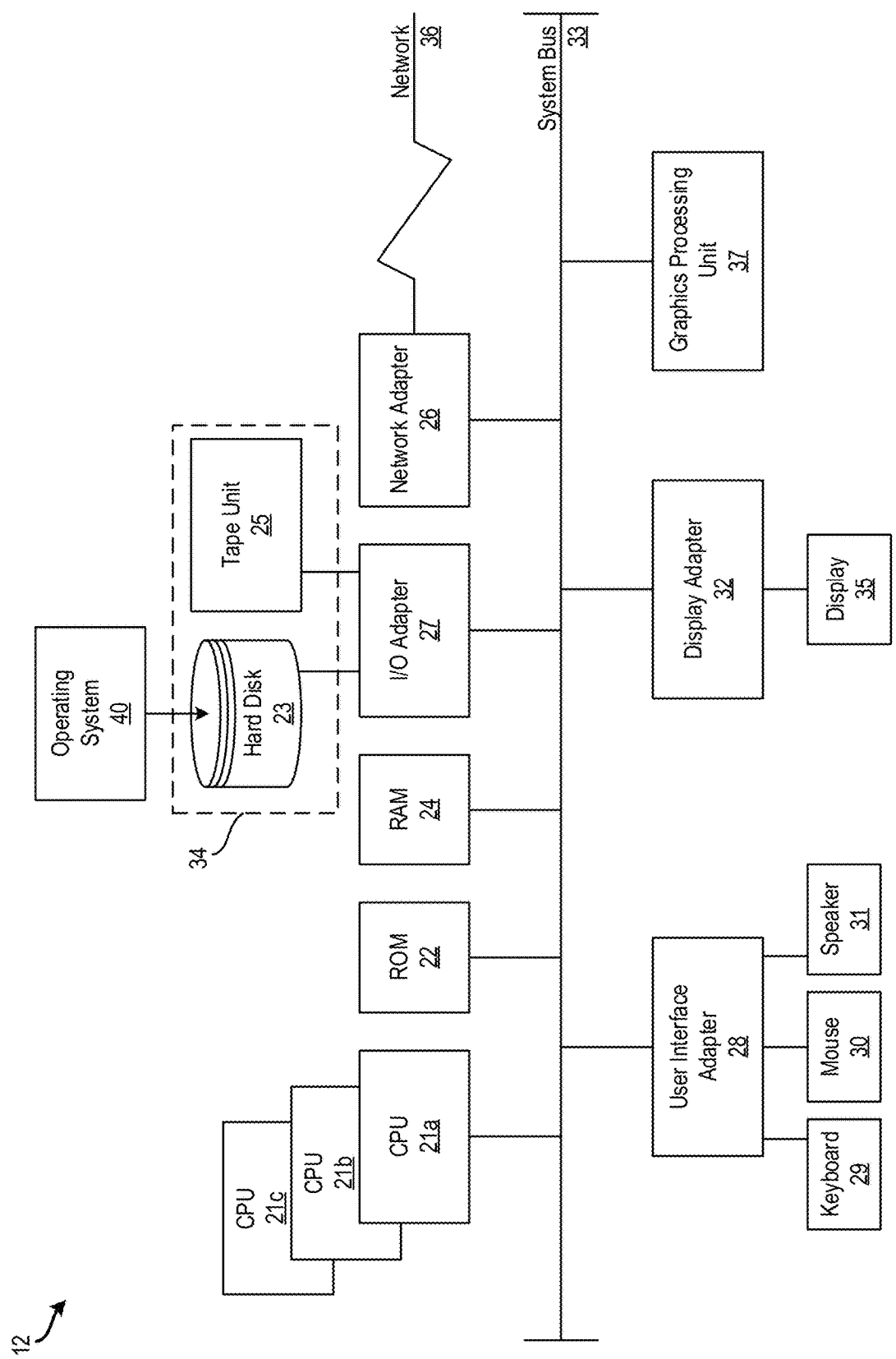
FIG. 2 depicts a block diagram of the processing system of FIG. 1, which can be used for implementing the techniques described herein according to aspects of the present disclosure.

FIG. 1 depicts a cross-sectional view of a wellbore operation 100 according to an embodiment of the present disclosure. The system and arrangement shown in FIG. 1 is one example to illustrate the downhole environment. While the system can operate in any subsurface environment, FIG. 1 shows downhole tools 10 disposed in a borehole 2 penetrating the formation 4. The downhole tools 10 are disposed in the borehole 2 at a distal end of a carrier 5, as shown in FIG. 1, or in communication with the borehole 2, as shown in FIG. 2. The downhole tools 10 can include measurement tools 11 and downhole electronics 9 configured to perform one or more types of measurements in an embodiment known as Logging-While-Drilling (LWD) or Measurement-While-Drilling (MWD).

According to the LWD/MWD embodiment, the carrier 5 is a drill string that includes a bottomhole assembly (BHA) 13. The BHA 13 is a part of the drilling rig 8 that includes drill collars, stabilizers, reamers, and the like, and the drill bit 7. The measurements can include measurements related to drill string operation, for example. A drilling rig 8 is configured to conduct drilling operations such as rotating the drill string and, thus, the drill bit 7. The drilling rig 8 also pumps drilling fluid through the drill string in order to lubricate the drill bit 7 and flush cuttings from the borehole 2.

Raw data and/or information processed by the downhole electronics 9 can be telemetered to the surface for additional processing or display by a processing system 12. Drilling control signals can be generated by the processing system 12 and conveyed downhole or can be generated within the downhole electronics 9 or by a combination of the two according to embodiments of the present disclosure. The downhole electronics 9 and the processing system 12 can each include one or more processors and one or more memory devices. In alternate embodiments, computing resources such as the downhole electronics 9, sensors, and other tools can be located along the carrier 5 rather than being located in the BHA 13, for example. The borehole 2 can be vertical as shown or can be in other orientations/arrangements.

It is understood that embodiments of the present disclosure are capable of being implemented in conjunction with any other suitable type of computing environment now known or later developed. For example, FIG. 2 depicts a block diagram of the processing system 12 of FIG. 1, which can be used for implementing the techniques described herein. In examples, processing system 12 has one or more central processing units (processors) 21a, 21b, 21c, etc. (collectively or generically referred to as processor(s) 21 and/or as processing device(s)). In aspects of the present disclosure, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 12.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 12 can be stored in mass storage 34. A network adapter 26 interconnects system bus 33 with an outside network 36 enabling processing system 12 to communicate with other such systems.

A display (e.g., a display monitor) 35 is connected to system bus 33 by display adaptor 32, which can include a graphics adapter to improve the performance of graphics intensive applications and a video controller. In one aspect of the present disclosure, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present disclosure, processing system 12 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 12 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 12.

FIG. 3 depicts a block diagram of a system 300 for model-based parameter estimation for direct drilling in a wellbore operation 301 according to aspects of the present disclosure. The system 300 uses online estimation 302 and offline estimation 304 to perform model-based parameter and state estimation.

Often times, many (e.g., tens or hundreds) different test wells are drilled in the same geographic region. During this process, a large set of data is measured/collected, which provides information about the interacting parts of the system and can aid in detecting changes in rock formation. This data can be used in the offline estimation 304 in order to "train" a complex model.

Some parameters change in a quasi-static fashion. That is, some parameters can be considered constant for a period of time larger than the characteristic time scale of the system. For such parameters, the offline estimation 304 approach can be used reliably during the static phases. For example, some parameters can change when the BHA enters a new formation and can be assumed to remain constant as long as the BHA does not enter a new formation (i.e., stays in the same formation).

In order to apply a control action to the wellbore operation 301, the states of the system and a parameter (e.g., the parameter $K_1$) need to be determined reliably in a short amount of time, which is accomplished using the online estimation 302 (e.g., the model-based parameter estimator 310 and the controller 314). The time constraint forces the estimation algorithm to use a simple model that can be solved quickly. The online estimated parameter $K_1$ is then adjusted or modified using the offline estimation 304.

Focusing now on the online estimation 302, a parameter estimator 310 and a plant model 312 are used to perform the online estimation. The model-based parameter estimator 310 receives measurement data from the wellbore operation 301. The measurement data can be obtained using sensors (e.g., pressure sensors, temperature sensor, force sensors, etc.) at the wellbore operation 301.

In order to provide sufficient system excitation, the controller 314 can be used to provide the system 300 with control actions that do not harm the operation but allow for observations that enable a better system parameter estimation.

Using the measurement data, the model-based parameter estimator 310 estimates a parameter and state and outputs the parameter and state to the plant model 312. The plant model can be a physical model, a transfer function, a neural network, a data driven model, a characteristic curve, a fuzzy set, etc. In one embodiment the plant model is a simple model that can be solved quickly (i.e., fast enough to be calculated within one time step) to generate state dynamics, which are provided to the model-based parameter estimator 310 to revise the parameter. This increases accuracy of the parameter estimated by the model-based parameter estimator 310. The state dynamics are also provided to the controller 314, which generates the control action used to control an aspect of the wellbore operation 301. In one embodiment the controller is a computer implemented closed loop control algorithm that determines optimum control actions based on the parameters, states, target, constraints, and complex model outputs as shown in FIG. 3C.

Figure 3A:
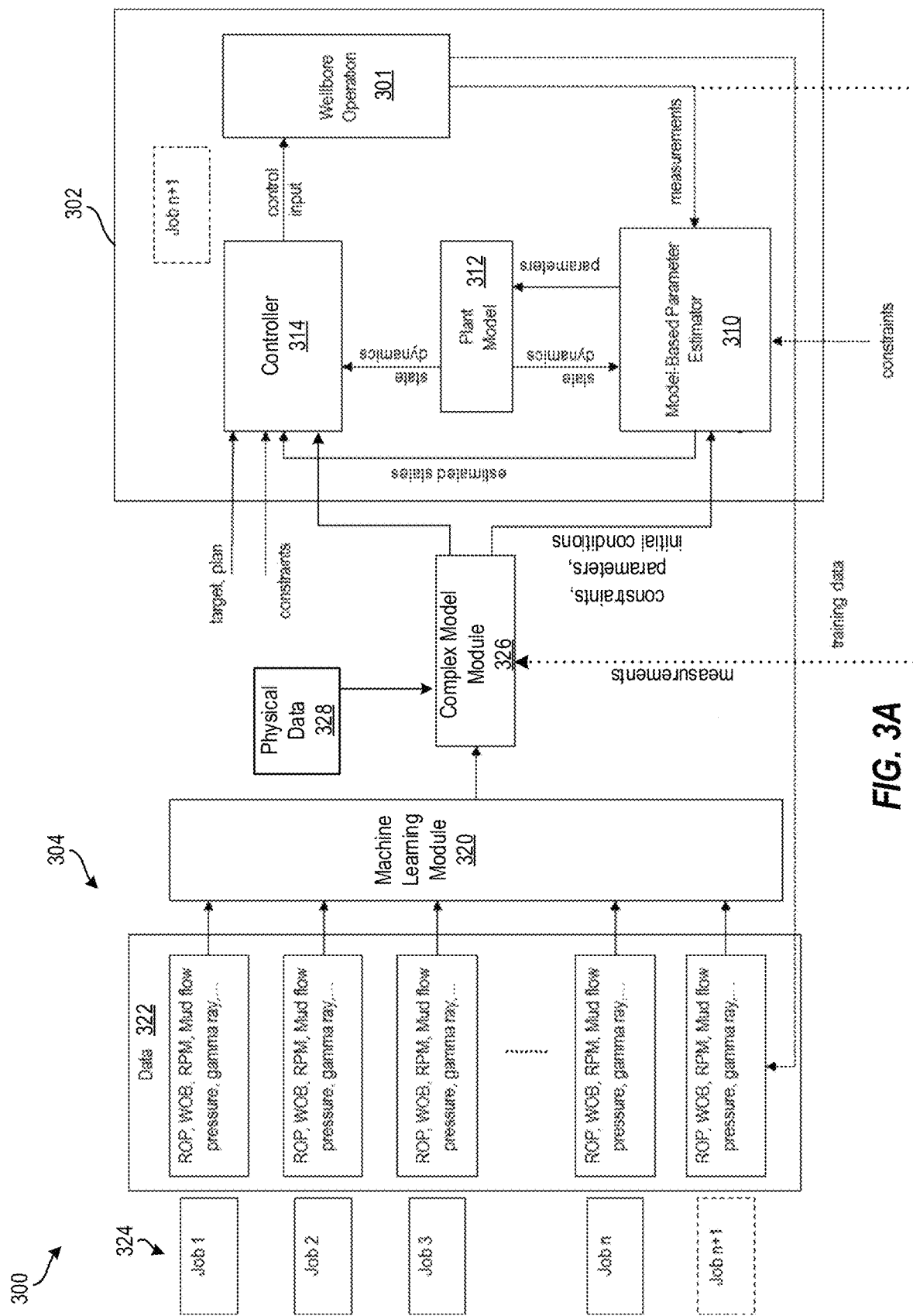
FIG. 3A depicts a block diagram of a system for model-based parameter estimation for direct drilling in a wellbore operation according to aspects of the present disclosure.

For example, FIG. 3B depicts a block diagram of an example of the controller of FIG. 3A according to aspects of the present disclosure. As shown in FIG. 3B, the controller 314 can include a pre-processor 315 to receive target, constraints, complex model outputs, states, and/or parameters and can output a control input (e.g., a steering direction, a steering force, a weight on bit, a revolutions per minute set point, a fluid pressure, dynamics, the issuing of an advice or the issuing an alert or an alarm, etc.) to a human operator. The human operator can then cause a control action to be implemented via the controller 314.

Similarly, FIG. 3C depicts a block diagram of another example of the controller of FIG. 3A according to aspects of the present disclosure. As shown in FIG. 3B, the controller 314 can include a closed loop controller 317 to receive target, constraints, complex model outputs, states, and/or parameters and can output a control action automatically without a human operator.

Returning to FIG. 3A, the closed loop controller can be implemented through a model-based controller. In another embodiment the controller includes a pre-processor that transforms its input signals into a control input. The control input can be a steering direction, a steering force, a weight on bit, a revolutions per minute set point, a fluid pressure, dynamics, the issuing of an advice or the issuing an alert or an alarm, etc. The control input can be read by a human operator (e.g. the directional driller or the driller), who can then transform the control input into the control action to control an aspect of the wellbore operation 301.

The offline estimation 304 can be used to supplement the online estimation 302 as discussed herein to refine parameter and state estimation. In particular, the offline estimation 304 uses a machine learning module 320 to develop a more complex model. In particular, the machine learning module 320 takes as training data collected data 322 collected from the jobs 324. Generally, the jobs 324 are or have been performed in a similar geographic area to the wellbore operation 301 or with similar BHAs. The machine learning module 320 feeds its results into the complex model module 326. The complex model module 326 computes an estimate of parameters (e.g., $K_1$), constraints (e.g., WoB limits, bending moment limits, etc.), and initial conditions, which are then used by the online estimation 302 to refine the parameter and state estimation. The outputs of the complex model module 326 can also fed into the controller 314. The simple models used by the plant model 312 and the model-based parameter estimator 310 are updated using a function of both the offline estimate 304 and the online estimation 302.

The complex model is a high fidelity model of the wellbore operation. The plant model is an online model usually focusing on only a certain aspect of the wellbore operation. Both models, the plant model used for online estimation and control and the "offline" complex model, are chosen from a set of different models for the wellbore operation. This enables, for example, a best possible model to be used for model based parameter estimation and control. In some examples, the complex model module 326 and/or the model-based parameter estimator 312 can include a best model selector.

Besides data from the machine learning module 320, the complex model module 326 can receive inputs from physical data 326, from measurements from the wellbore operation, or from a combination of these. In some examples, the machine learning module 320 may or may not be used because the physical data and the measurements can be used directly within the complex model module 326.

According to some examples, parameter constraints derived by the offline estimation 304 are input into model-based parameter estimator 310 to improve parameter estimation in the online estimation 302. Further external constraints can also be exploited. The controller 314 can accept as inputs targets, plans, and constraints as well as the state dynamics from the plant model 312 to predict, for example, future bit position, to apply a control action to the wellbore operation 301 to achieve certain desired results.

A goal of the plant model is to determine iteratively the drilling direction of the bit depending on the system's inputs. The model can be of different degrees of detail. An example of a simple drill-ahead model with a low degree of detail (kinematic model) is shown using the following equation:

$$\frac{dx(s)}{ds} = \begin{bmatrix} \sin(inc(s))\cos(azi(s)) \\ \sin(inc(s))\sin(azi(s)) \\ \cos(inc(s)) \\ K_1 F_{BUILD} \\ K_1 F_{WALK} \\ \sin(inc(s)) \end{bmatrix} = f(x, u, p), \text{ with } x = \begin{bmatrix} n \\ e \\ d \\ inc \\ azi \end{bmatrix}$$

The output of the function is equal to the states, so the drilling process is described by the position $[n\ e\ d]^T$ and the orientation $[inc\ azi]^T$. To increase the precision of the model, the parameter $K_1$ can be adapted over the measured depth s.

Figure 4:
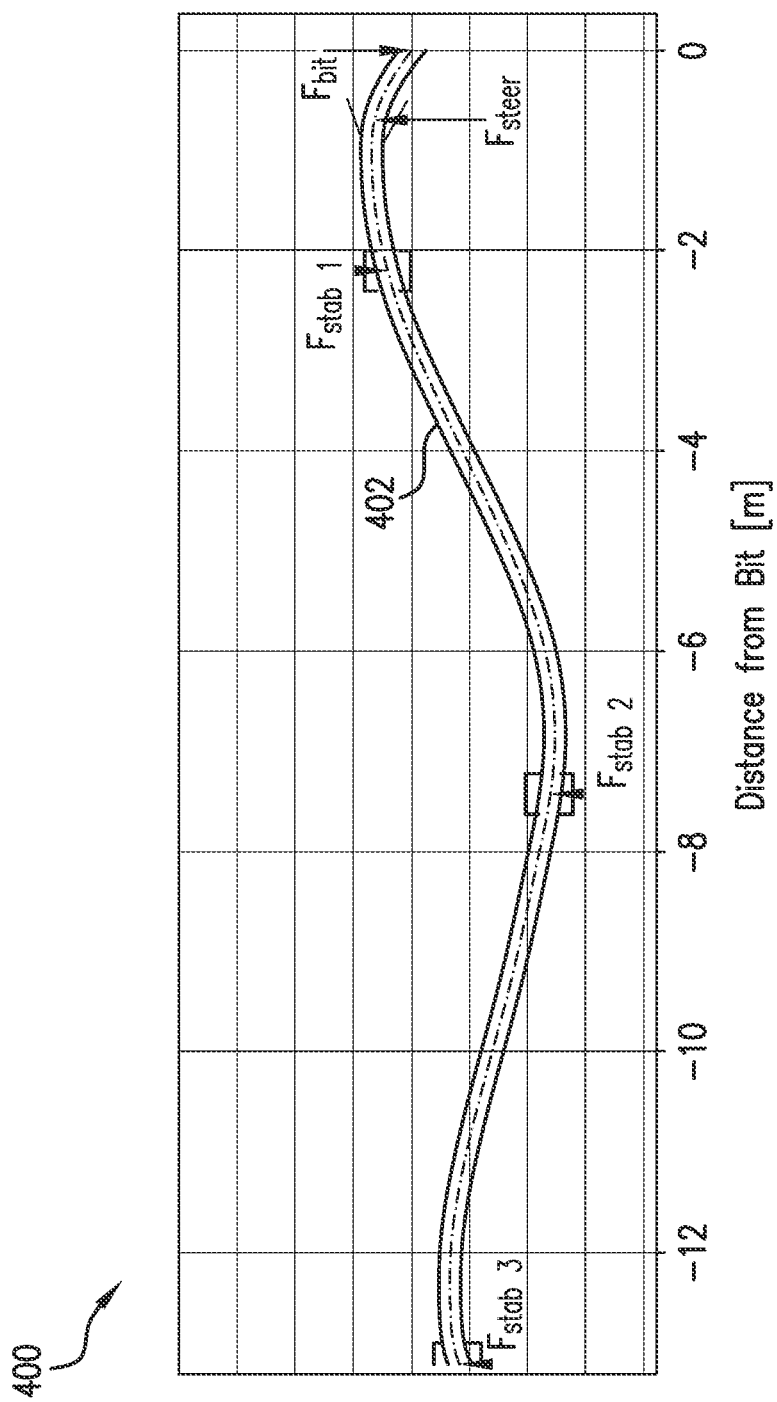
FIG. 4 depicts a multiple bending beam model according to aspects of the present disclosure.

The drill-ahead BHA model 400 contains two parts. The first part includes a multiple bending beam model of the BHA, which is used to determine the static force and tilt at the bit of a drill in the wellbore operation 301. In particular, FIG. 4 depicts a multiple bending beam model 400 according to aspects of the present disclosure.

Figure 5:
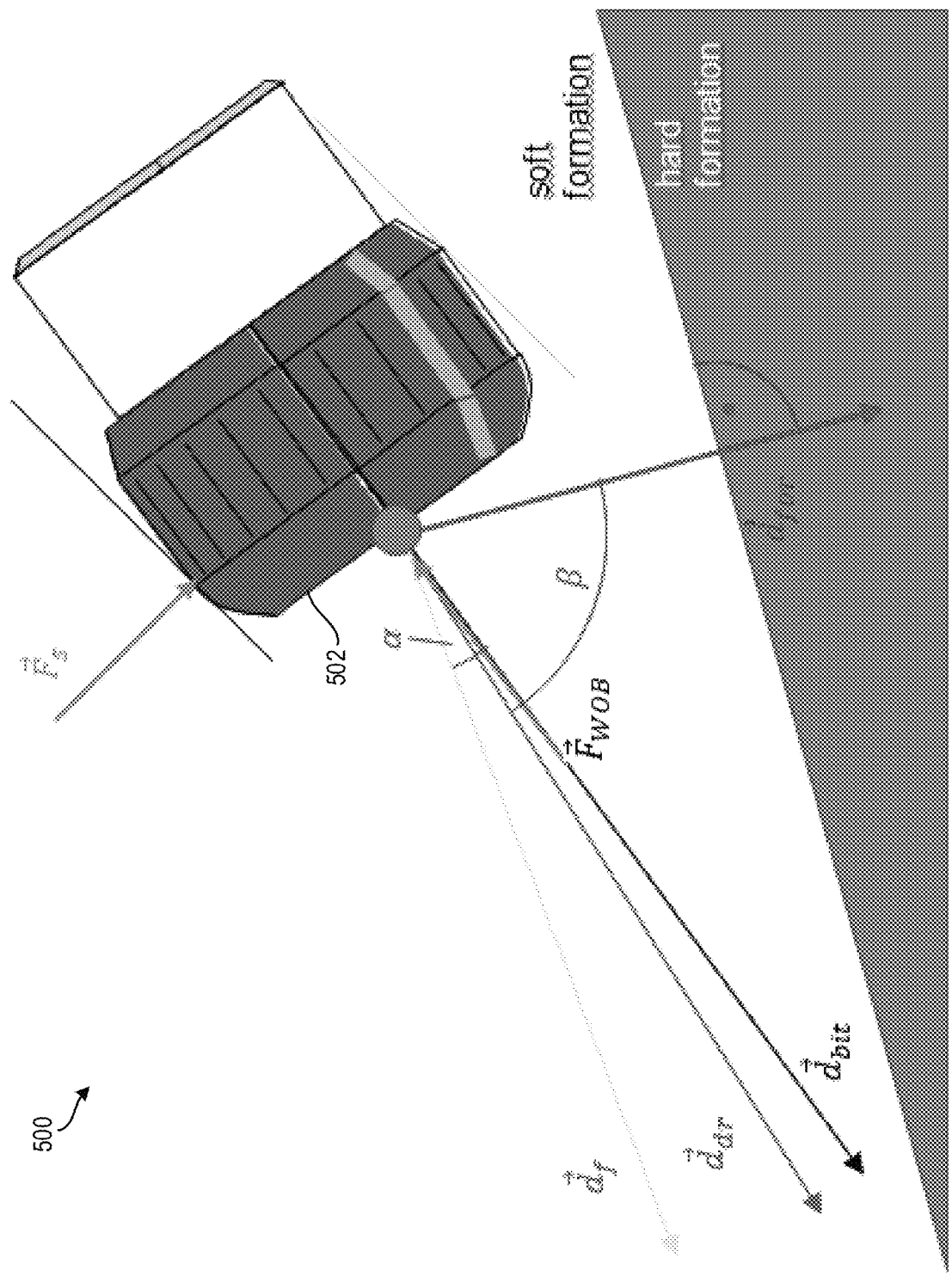
FIG. 5 depicts a BHA-rock interaction model according to aspects of the present disclosure.

The second part is a BHA-rock interaction model that calculates the drilling direction based on the bit force and tilt. FIG. 5 depicts a BHA-rock interaction model 500 according to aspects of the present disclosure. One example of the BHA-rock interaction model is the Ho-model, described based on the following equation:

$$r_N \vec{d}_{dr} = I_R \cdot (1-I_B) \cdot \cos(\alpha) \cdot \vec{d}_{bit} + I_R \cdot I_B \cdot \vec{d}_f + (1-I_R) \cdot r_N \cdot \cos(\beta) \cdot \vec{d}_{for},$$

where $I_B$ is the bit anisotropy, $I_R$ represents the rock anisotropy, and $r_N$ is the ratio of the drilling rate and the bit force normal to the formation bedding. With reference to FIG. 5, the following parameters are defined: $\vec{F}_s$ is a side force vector acting on the drill bit 502; $\vec{F}_{WOB}$ is a weight on bit vector; $\vec{d}_f$ is a resulting force directional vector; $\vec{d}_{for}$ is a resulting formation directional vector; $\vec{d}_{bit}$ is a resulting bit direction vector due to beam bending; and $\vec{d}_{dr}$ is a resulting drilling direction vector.

According to some embodiments, this model can be varied by adapting $I_B$ depending on applied drilling parameters (e.g., rotary speed) and formation characteristics. It should be appreciated that the present techniques are not limited to these two examples and can work using various parameterized models, including simple models with only a small number of parameters and states and more complex data-driven models.

Figure 6:
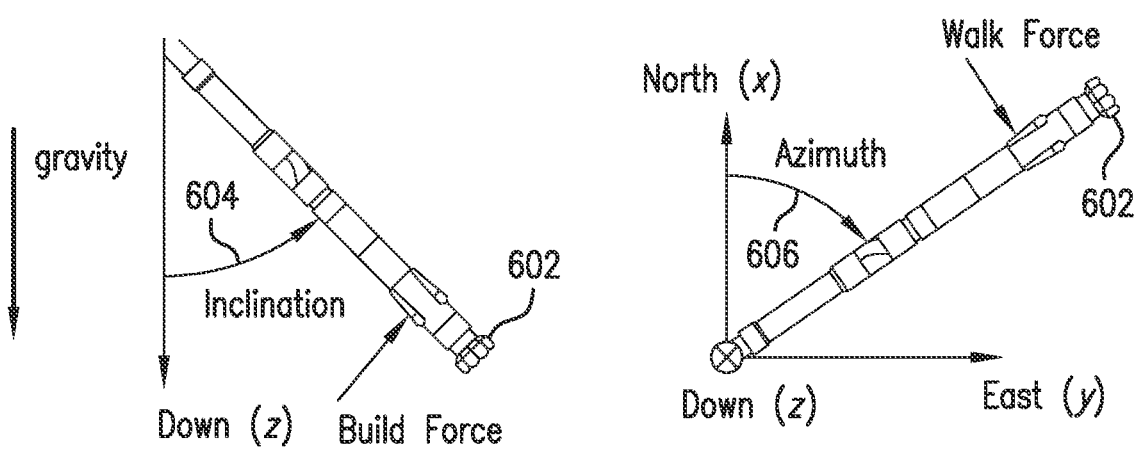
FIG. 6 depicts the inclination and the azimuth of the drill bit according to aspects of the present disclosure.

With continued reference to FIG. 3, according to one or more embodiments of the present disclosure, the model-based parameter estimator 310 can use a kinematic model of the BHA, which can use, for example, Euler coordinate or quaternions. The following Euler coordinates are considered as an example. The states of the model are the drill bit position of the drill bit with respect to a coordinate system with zero at the drilling rig based on the inclination and the azimuth of the drill bit. FIG. 6 depicts the inclination 604 and the azimuth 606 of the drill bit 602 according to aspects of the present disclosure. The states can be summarized using the vector x=[n, e, d, inc, azi] and, depending on the fidelity of the model, additional states are possible (e.g., toolface). It is also possible to consider actuator dynamics. The states evolve following the simple drill-ahead model as follows:

$$\frac{dx(s)}{ds} = \begin{bmatrix} \sin(inc(s))\cos(azi(s)) \\ \sin(inc(s))\sin(azi(s)) \\ \cos(inc(s)) \\ K_I F_{BUILD} \\ \frac{K_I F_{WALK}}{\sin(inc(s))} \end{bmatrix} = f(x, u, p)$$

where s is the measured depth. The model is described in a depth-domain representation as opposed to a time-domain representation. The inputs to the system are walk force and build force. These are summarized in the input vector u=[$F_{BUILD}$, $F_{WALK}$].

In some examples, if y(s) is the vector of measurements then y(s)=x(s). $K_1$ is a multiplicative factor between the forces applied to the drill bit 602 and the consequent change in inclination 604 and azimuth 606 respectively. This parameter $K_1$ depends on, for example, the rate of penetration, the weight on bit, and the formation. Generally the exact value of $K_1$ is not known and needs to be estimated by the model-based parameter estimator 310. Estimating this parameter is important for an effective control and state estimation; therefore, an online estimation 302 is performed. In the case of the simple drill-ahead model the following equation holds p=$K_1$.

To represent model mismatch, state, and measurement noise, the system can be modified by adding the following contributions:

$$\frac{dx(s)}{ds} = f(x, u, p) + w(s)$$

$$y(s) = x(s) + v(s),$$

where the state noise and model mismatch are represented by w and measurement noise is represented by v. The model-based parameter estimator 310 minimizes the mismatch between the model and the wellbore operation by weighting the model and measurements effect into the estimation. Knowledge of the accuracy of the underlying model and measurement accuracy is generally represented by covariance matrices. Therefore the model-based parameter estimator 310 uses these matrices as a weight factor.

Various algorithms have been developed for state and parameter estimation, e.g. Kalman filter, extended Kalman filter, particle filter, etc. As one example, the model-based parameter estimator 310 can utilize moving horizon estimation (MHE), which advantageously uses the history of past measurements in order to compute the "best" estimate of the parameters instead of relying on only the last measurement. MHE can also take into account constraints. Both characteristics help to improve the quality of the estimate.

Using MHE, the model-based parameter estimator 310 takes as input measurement data including forces applied to the drill bit, noise measurements, and tuning parameters (provided by a user) and provides as output an estimate of the parameters. The estimated parameters are then sent to the plant model 312 to generate the state dynamics that are used by the controller 314 to determine the appropriate control action for the wellbore operation 301. The action can then be applied, for example, to the drill bit. In this way, real-time estimation of parameters and states are provided.

By applying MHE, a minimization problem is solved. For example, at each time step, the MHE algorithm attempts to minimize the following objective function:

$$L(x_{k-N}, w, p_{k-N}) = \frac{1}{2} \left\| \begin{matrix} x_{k-N} - \hat{x}_{k-N} \\ p_{k-N} - \hat{p}_{k-N} \end{matrix} \right\|^2_{\Pi^{-1}_{k-N}} + \frac{1}{2}\sum_{j=k-N}^{k-1} \|w_j\|^2_{Q^{-1}} + \frac{1}{2}\sum_{j=k-N}^{k-1} \|v_j\|^2_{R^{-1}}$$

subject to inequality and equality constraints, that is $$\min_{x_{k-N}, w, p_{k-N}} L(x_{k-N}, w, p_{k-N})$$

subject to $$x_{k+1} = F(x_k, u_k, p_k) + w_k$$

$$g(x_k, u_k, p_k) \leq 0$$

where $(\bullet)_k$ represents the discrete-time representation. $F(\bullet)$ is therefore as follows:

$$F(x_k, u_k, p_k) = \int_{s_k}^{s_{k+1}} f(x(s), u(s), p(s)) ds.$$

Vectors summarizing state noise, state, input, and parameter along the horizon are represented with the variables w, x, u, and p respectively as follows:

$$x = \{x_{k-N}, x_{k-N+1}, \ldots, x_k\}$$

In particular, the offline estimation 304 uses at least one of offset well data collected from various offset wells (e.g., job 1, job 2, job 3, job n, etc.) and/or data from the current well as initial values for the online estimation 302 to reduce errors in the online estimation 302. For example, wrong initial values can result in significant error in calculated steer forces for a next prediction horizon. The data 322 from previous jobs 324 can be used to initialize the estimation to achieve a better initial value for the online estimation 302.

The model-based parameter estimator 310 is provided as an input offline log data instead of online surveys and while-drilling data.

Data from offset wells (e.g., jobs 324) can also be used to improve the online estimation 302. In case of similar formations in both the offset-well and the current well (i.e., the subject well of the wellbore operation 301), a weighted average of online and offline parameters along measured depth or total vertical depth can be used to accelerate the parameter estimation speed at formation changes, which improves the wellbore quality.

For example, let $h_\theta(z)$ be the hypothesis function (data-driven or first principle model) representing a complex system or a complex model, e.g. BHA-rock interaction model and z is the vector of features (i.e., rate of penetration, weight on bit, etc.) that are collected. The vector y indicates the training data, or output of the model. Accordingly, a learning algorithm used by the machine learning module 320 is as follows:

$$\min_\theta \tilde{L}(h_\theta(z) - y)$$

where the objective function $\tilde{L}(\bullet)$ depends on the learning algorithm and it is, in general, a non-convex function with possibly a large number of parameters and features. In order to estimate the parameters reliably, the learning algorithm uses a certain amount of learning data, which is why using data coming from different jobs in the same geographic area is important to successfully build a 3D map of the BHA-rock interaction for that particular geographic drilling area. This knowledge will be used to adjust the online estimation 302, which in contrast uses information which is only local and specific to the current job at the wellbore operation 301.

Changes in rock formation, or in control operation during the drilling process can abruptly change the dynamics of the BHA. These changes can trigger selecting a suitable model from a set of models describing the BHA process. The set of models represent different aspects or modes of operation of the drilling process. Besides parameter estimation and adaptation, the used estimation scheme, or learning strategy, can select a best suitable model from a set of available models to improve the estimation and control of the wellbore operation 301. According to an example, a selection criteria for the best model is the minimization of the resulting model error:

$$f^*, p^* = \arg\min_{f_i(p_i)} \sum [y_{meas} - y_{model}(f_i(p_i))]^2,$$

where $f_i \in [f_0, \ldots, f_M]$ is a model chosen from a set of models (also called modes), $y_{meas}$ is the measured system output, and $y_{model}$ is the model output.

The parameter vector $p_i$ in general represents different sets of parameters for each mode. Basically, the mode is selected by finding the best fitting model together with its best set of parameters. The resulting model is then used by a closed loop control of the drilling operation, or by an advisory system (i.e., "pre-processor") that can advise a human operator (e.g. the directional driller) with the best control action to take with respect to a drill plan.

It should be appreciated that the different models in the set could also be structurally the same (therefore with the same set of parameters) but have different parameter values. In this case the, minimization will jump from one set of parameter value to another by maintaining the model structure unchanged. Furthermore, the use of models enables implementation of learned parameters and adjusted modes from previous drilling campaigns.

According to aspects of the present disclosure, the disclosed parameter estimation method and the disclosed calculation of the control action to the wellbore operation 301 is not performed manually within drilling operation due to its complexity and the time constraint imposed by the wellbore operation dynamics. In some examples, the techniques provided herein can be implemented on a computing device or system.

The present techniques can be applied in a number of different applications within directional drilling. For example, the drill-ahead model tailored to a specific drilling job generated using online estimation 302 and offline estimation 304 can be used to derive an optimum well path towards a drilling target. Furthermore it can be used to derive well plan metadata (e.g., bending moment). Ultimately this information can be exploited by the controller 314 to minimize a number of downlinks and to provide an automated guidance for directional drillers to drill wells efficiently and reduce non-productive time. In particular, the present techniques can be used to calculate steer forces and angles, to detect formation changes, to predict well paths, to create virtual sensors, to provide vibration management, and the like.

Figure 7:
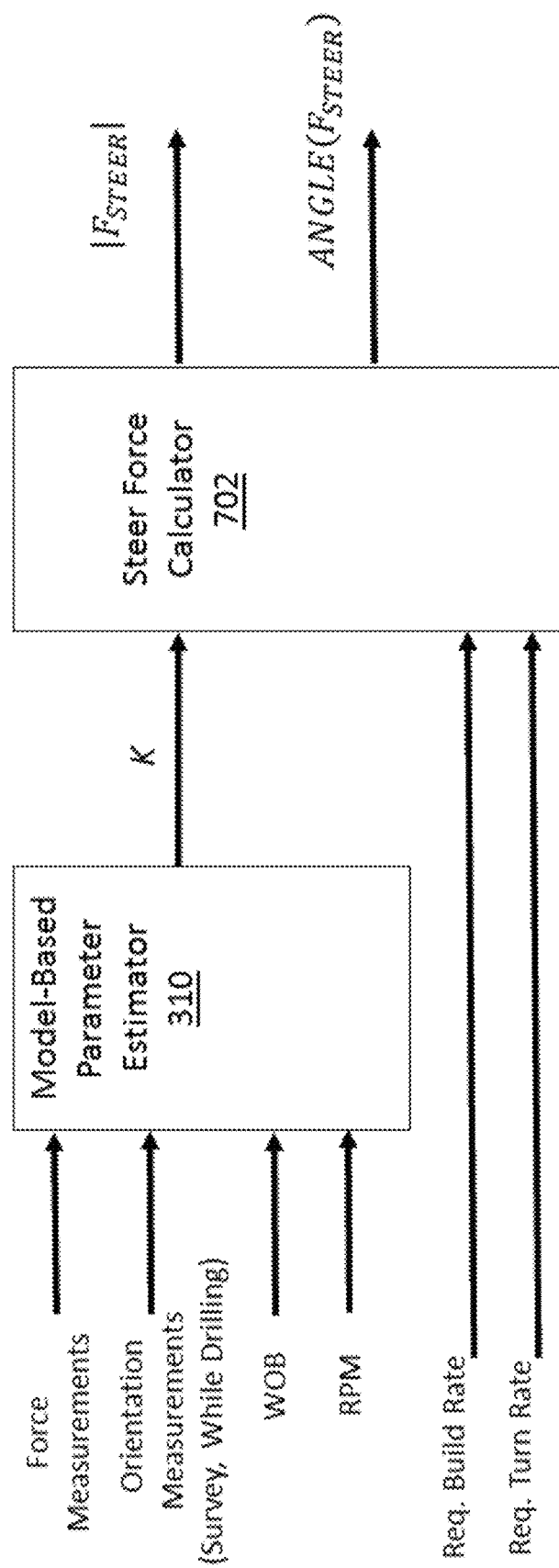
FIG. 7 depicts a block diagram of a steer force calculator that uses a model-based parameter estimator according to aspects of the present disclosure.

In an example, the present techniques can be used to calculate precisely the steer forces and steer direction for a rotary steerable system automatically. FIG. 7 depicts a block diagram of a steer force calculator 702 that uses a model-based parameter estimator 310 according to aspects of the present disclosure. In some current implementations, the calculation of steer forces is a manual process, which does not take into account any parameters describing the BHA-rock interaction. Consequently, the current calculation of the steer forces is imprecise, which translates to frequent readjustment of the steer forces and with that to many directional downlinks causing non-productive time.

The calculated steer force and steer direction can be downlinked to a steering device by field personnel, by drilling automation applications, etc. The steering device, which is placed behind the drill bit, is used to control the borehole trajectory in the wellbore operation 301. An example steering device can use hydraulically actuated ribs that are pushed against the borehole wall to create a directed force. This force deflects the drilling system in the desired direction. In other words, the forces steer the bit and therefore change inclination and azimuth as discussed herein.

Using the example of the simple drill-ahead model described above, the multiplicative factor describes the relation between the forces applied to the bit and the consequential change in inclination and azimuth. Experienced directional drillers implicitly estimate this factor using survey data but do not take into account the dependency of this parameter on surface parameters like WOB, ROP, etc. The present disclosure make it possible to estimate the multiplicative factor automatically and take into account the influence of relevant drilling parameters like WOB and ROP as well.

The relationship between steer forces, inclination change (i.e., build rate), and azimuthal change (i.e., turn rate) is expressed as follows:

$$F_{BUILD} = \frac{BR}{K} = \frac{\frac{d(inc)}{ds}}{K}$$

$$F_{WALK} = \sin(inc)\frac{TR}{K} = \sin(inc)\frac{\frac{d(azi)}{ds}}{K}$$

where FWALK represents the walk force and FBUILD represents the build force. BR represents the build rate, and TR represents the turn rate. The inclination is symbolized with inc and the azimuth with azi. The walk force and the build force is transformed into the resulting steer force by using the following equation:

$$|F_{STEER}| = \sqrt{F_{BUILD}^2 + F_{WALK}^2}.$$

Finally, the steer direction is calculated by exploiting the trigonometric relationship as follows:

$$\mathrm{ANGLE}(F_{STEER}) = \arctan\left(\frac{F_{WALK}}{F_{BUILD}}\right).$$

The model parameter (e.g., the parameter K) is estimated by the model-based parameter estimator 310 using an MHE as discussed herein. The MHE used in this example takes as input the forces applied to the bit, the orientation measurements of the downhole tool, surface parameters like WOB, RPM and some tuning parameters. The output of the estimator is the parameter K, which is then used in the previous equations to calculate the steer forces and steer direction by the steer force calculator 702. One advantage of the usage of MHE is that it makes use of statistics to reduce noise that is superimposed on the measurement data.

Figure 8:
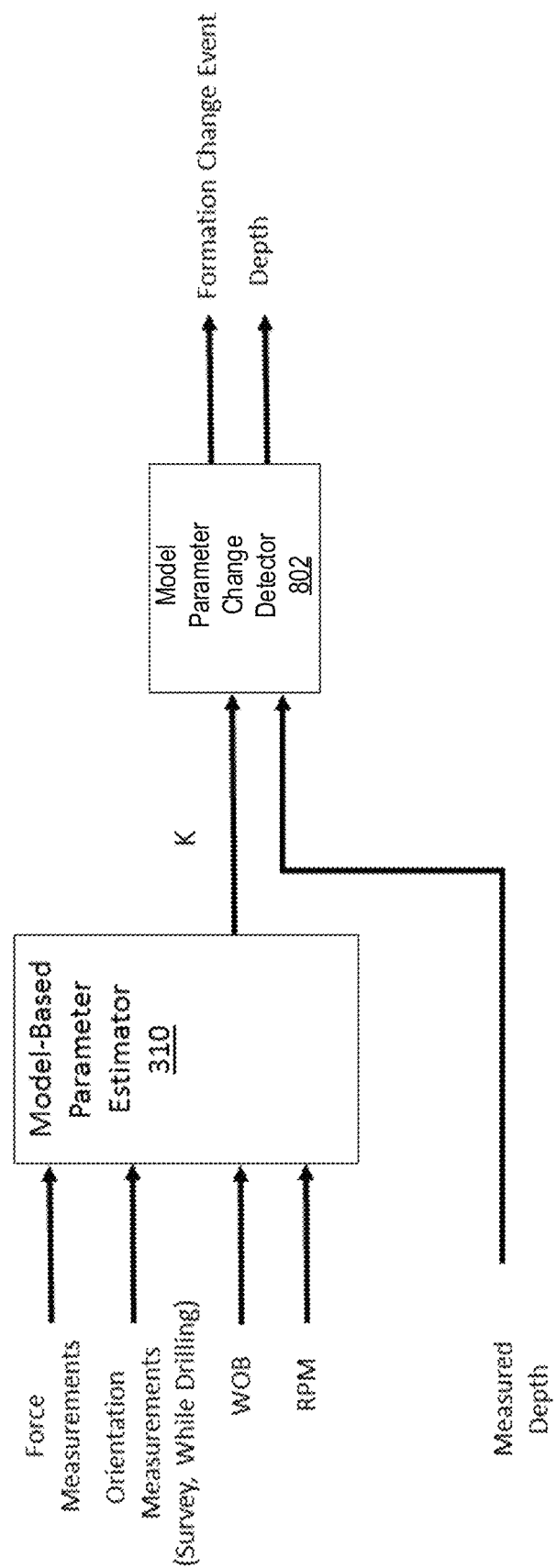
FIG. 8 depicts a block diagram of a model parameter change detector calculator that uses a model-based parameter estimator according to aspects of the present disclosure.

In another example, the present techniques can be used determine formation changes in an earth formation (e.g., the formation 4). FIG. 8 depicts a block diagram of a model parameter change detector calculator 802 that uses a model-based parameter estimator 310 according to aspects of the present disclosure. This is achieved by observing the by the MHE estimated parameter(s) over depth. In one example, the model-based parameter estimator uses MHE to determine the simple drill-ahead model to determine the parameter K, which is a function of the drilling parameters (e.g. WOB, RPM), the BHA, and the formation. This behavior is exploited to detect formation changes and an associated depth by the model parameter change detector 802.

Figure 9:
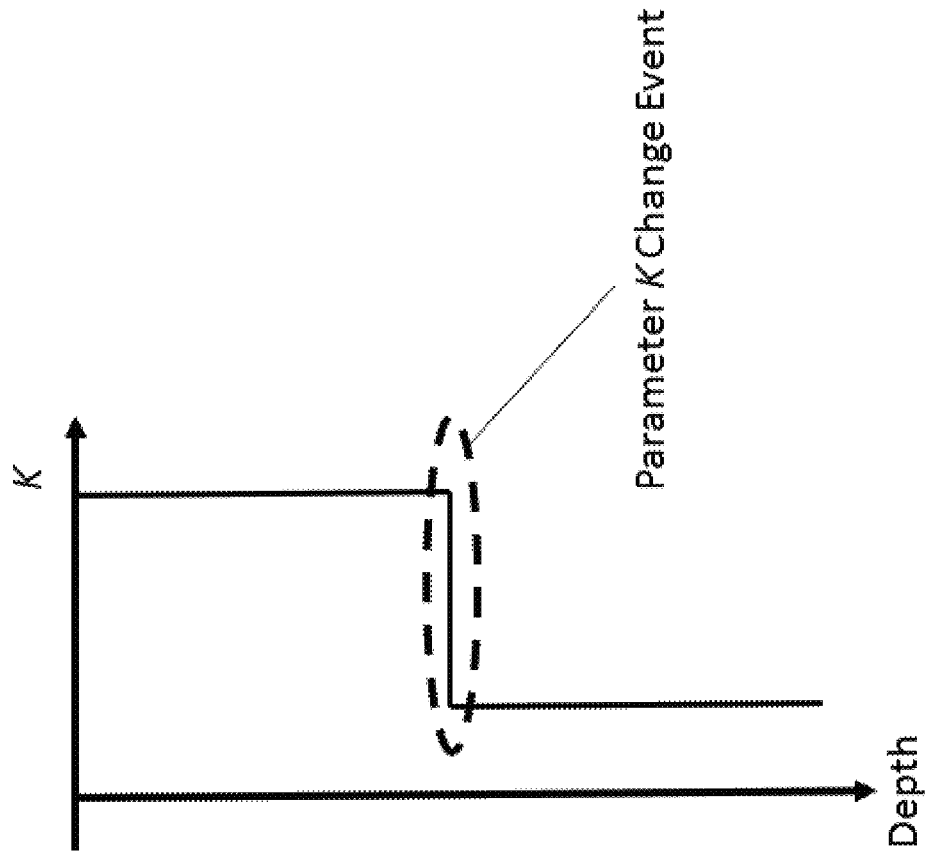
FIG. 9 depicts a model parameter change event according to aspects of the present disclosure.
Figure 9:
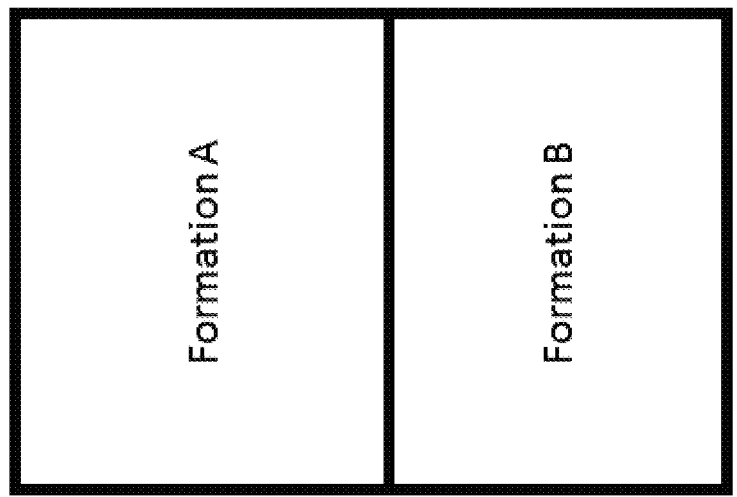

It is assumed that a well is drilled in a homogeneous formation (e.g., the formation A). Under these conditions the parameter estimate of the model parameter (e.g., the parameter K) is constant. If the drill bit hits another formation (for example a harder formation) (e.g., the formation B), the value of the model parameter changes abruptly as the formation changes. If the formation is harder, the value of the model parameter decreases. If the formation is softer, the value of K increases. The change of the model parameter can be detected automatically. The relationship of the model parameter and the change of formation is depicted in FIG. 9, which depicts a model parameter change event between formation A and formation B.

In another embodiment, a drill-ahead model with a higher degree of detail is used to determine the unknown drilling parameters. Again, these parameters will change simultaneously when another formation is hit. Instead of relying only on one parameter, multiple parameters are used to reveal a clear formation change event, ultimately leading to a more robust formation classification.

A parameter change event can also be used to detect stringers. A stringer is a piece of hard formation embedded in a softer formation. Alternatively, the parameter change event can be used in existing stringer detection applications to reduce the uncertainty of their detection scheme. In another embodiment, the formation change detection event can be utilized to improve the accuracy of existing formation evaluation methods.

Figure 10:
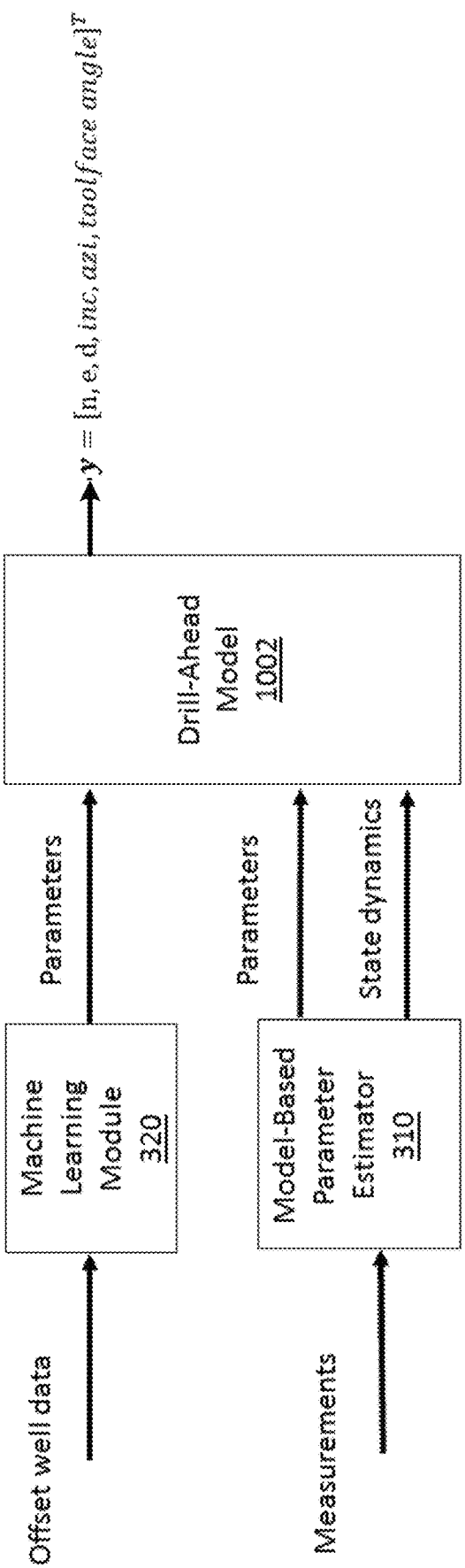
FIG. 10 depicts a drill-ahead model to calculate a well path according to aspects of the present disclosure.

Another application of the present techniques is to utilize the model with the estimated parameters to predict the future well path. FIG. 10 depicts a drill-ahead model 1002 to calculate a well path according to aspects of the present disclosure. This is accomplished by e.g. using the model parameter estimate together with the actual build and walk forces to calculate the incremental change in azimuth and inclination. Accordingly, it is possible to calculate a future trajectory.

In an embodiment, the present techniques are used to estimate the model parameter (e.g., the parameter K) and then solve the simple kinematic differential equation for the drilling system to calculate (i.e., predict) the future well path using the drill-ahead model 1002. Using Cartesian coordinates n, e, d (i.e., north, east, down) the equations for the bit position are as follows:

$$n = \int_{s_0}^{s} \sin(inc)\cos(azi)d\tilde{s},$$

$$e = \int_{s_0}^{s} \sin(inc)\sin(azi)d\tilde{s},$$

$$d = \int_{s_0}^{s} \cos(inc)d\tilde{s}.$$

The inclination and azimuth values are used to solve the integrals. Inclination and azimuth are calculated using the estimate of a model parameter (e.g., the model parameter K) as follows:

$$inc = \int_{s_0}^{s} K F_{BUILD} d\tilde{s},$$

$$azi = \int_{s_0}^{s} K \frac{1}{\sin(inc)} F_{WALK} d\tilde{s}$$

Note that an extra estimate of the rate of penetration is not necessary as the description of the system is completely done in the depth domain.

In another embodiment, a more complex drill-ahead model is used for predicting the trajectory. The beam model offers a high accuracy predicting a trajectory but relies on proper estimates of many parameters. The present techniques can be used to estimate those parameters simultaneously. The outputs of the beam model are can be written in vector format as $y = [n, e, d, inc, azi]^T$. The outputs are expressed using the nonlinear state space model:

$$\frac{dx(s)}{ds} = f(x, p, u),$$

$$y = c(x),$$

where f, c are vectors of the nonlinear functions f1, ..., fn, and c1, ... cn. Depending on the model, some of the nonlinear functions are known (e.g., from a physical model), whereas other nonlinear functions within the drill-ahead model contain parameters that need to be identified. If offset well data is available, the unknown parameters are either estimated offline by using by using a least-square technique. For online parameter estimation a MHE is used. Parameter tracking is done using the model-based parameter estimator 310.

Figure 11:
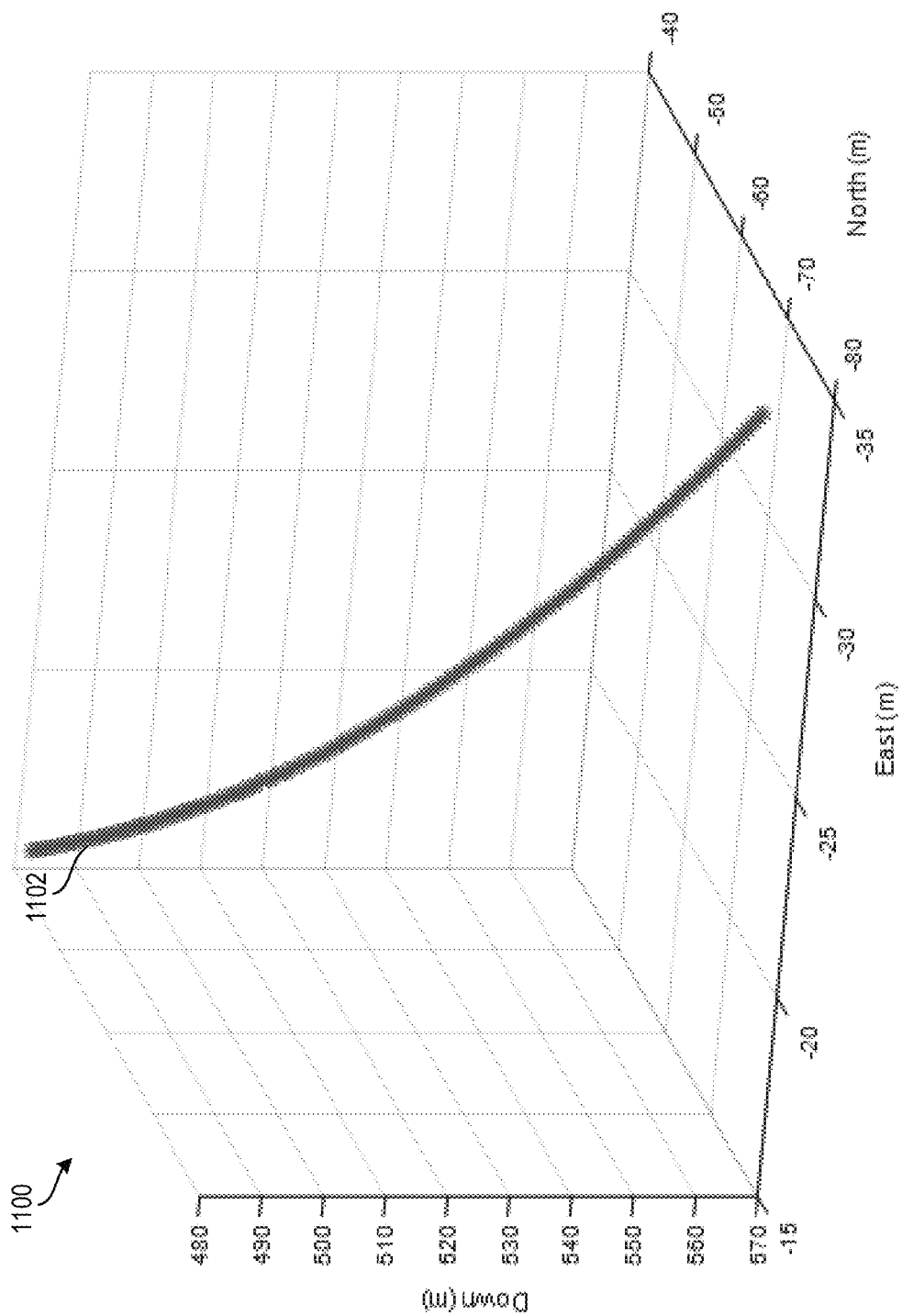
FIG. 11 depicts a three-dimensional plot of a predicted well path according to aspects of the present disclosure.

One example of results of the path prediction are demonstrated in FIG. 11. In particular, FIG. 11 depicts a three-dimensional plot 1100 of a predicted well path 1102 according to aspects of the present disclosure. The prediction length is set exemplarily to 90 meters. The prediction length can be changed to any required prediction length. The well path has been derived using a drilling system model whose parameters are estimated using the invention. Build and walk force are kept constant throughout the prediction horizon. It should be appreciated that the prediction of the well propagates uncertainty information through it is prediction. Predicted points close to the actual position contain less uncertainty as predicted points that are far away from the actual position.

Figure 12:
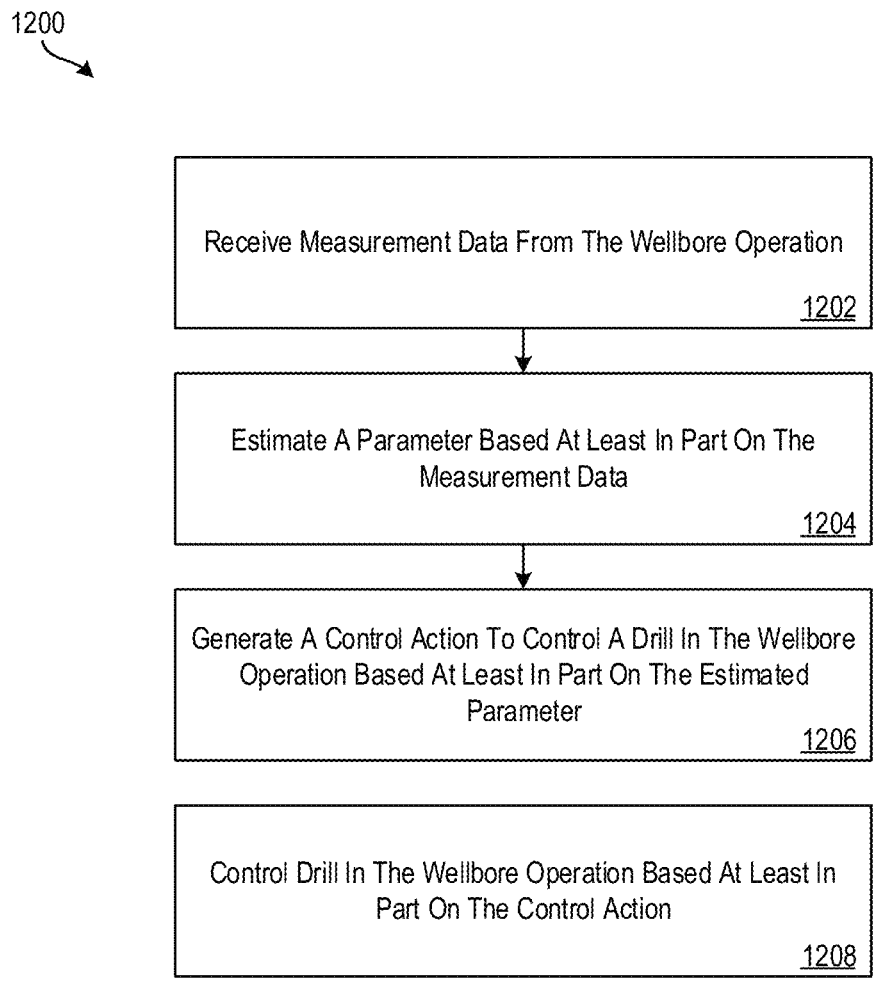
FIG. 12 depicts a flow diagram of a method for model-based parameter estimation for directional drilling in a wellbore operation according to aspects of the present disclosure.

FIG. 12 depicts a flow diagram of a method 1200 for model-based parameter estimation for directional drilling in a wellbore operation of the present disclosure. The method 1200 can be implemented by any suitable processing system, such as the processing system 12 of FIGS. 1 and 2 or the system 300 of FIG. 3.

At block 1202, the model-based parameter estimator 310 (e.g., a processor or processing device) receives measurement data from the wellbore operation 301. At block 1204, the model-based parameter estimator 310 estimates a parameter based at least in part on the measurement data. In some examples, estimating the parameter is based at least in part on constraints generated from a machine learning technique. The machine learning technique can utilize a neural network or other machine learning techniques. The neural network, for example, receives as inputs job data from a plurality of jobs and generates the constraints based at least in part on the job data. The jobs data can include rate of penetration data, weight on bit data, rotation per minute data, fluid pressure data, and gamma ray data, among other data. In additional examples, estimating the parameter is based at least in part on a bit anisotropy and a rock stiffness generated from a machine learning technique.

At block 1206, the controller 314 generates a control action to control a drill or other tool in the wellbore operation based at least in part on the estimated parameter. At block 1208, the controller 314 controls the drill in the wellbore operation based on the control action.

Additional processes also can be included. For example, the method 1200 can additionally include calculating a steer force and a steer angle based at least in part on the estimated parameter. The steer force and the steer angle can be generated as the control input and can be used to control the drill. Calculating the steer force and the steer angle can be based at least in part on a desired build rate and a desired turn rate. In an additional example, an earth formation change can be determined based at least in part on the estimated parameter and a measured depth. It should be understood that the processes depicted in FIG. 12 represent illustrations, and that other processes can be added or existing processes can be removed, modified, or rearranged without departing from the scope and spirit of the present disclosure.

Set forth below are some embodiments of the foregoing disclosure:

Embodiment 1

A computer-implemented method for model-based parameter and state estimation for directional drilling in a wellbore operation, the method including: receiving, by a processing device, measurement data from the wellbore operation; performing, by the processing device, an online estimation of at least one of a parameter to generate an estimated parameter and a state to generate an estimated state, the online estimation based at least in part on the measurement data; generating, by the processing device, a control input to control an aspect in the wellbore operation based at least in part on the at least one of the estimated parameter and the estimated state; and executing a control action based on the control input to control the aspect of the wellbore operation.

Embodiment 2

The computer-implemented method of any prior embodiment, wherein the online estimation is selected from the group consisting of moving horizon estimation, extended Kalman filter estimation, and least squares estimation.

Embodiment 3

The computer-implemented method of any prior embodiment, wherein performing the online estimation of the at least one of the parameter and the state is based at least in part on constraints, parameters, and initial conditions generated during offline estimation.

Embodiment 4

The computer-implemented method of any prior embodiment, wherein the constraints, parameters, and initial conditions generated during offline estimation are generated using a machine learning technique.

Embodiment 5

The computer-implemented method of any prior embodiment, wherein the machine learning technique receives as inputs job data from a plurality of jobs and generates the constraints, parameters, and initial conditions based at least in part on the jobs data.

Embodiment 6

The computer-implemented method of any prior embodiment, wherein the jobs data comprises rate of penetration data, weight on bit data, rotation per minute data, fluid pressure data, and gamma ray data.

Embodiment 7

The computer-implemented method of any prior embodiment, wherein underlying models used to perform the online and offline estimations are selected from a set of wellbore operation models by minimizing an error between a measurement from wellbore operation and calculated measurements from the underlying models.

Embodiment 8

The computer-implemented method of any prior embodiment, further including calculating, by the processing device, a steer force and a steer angle based at least in part on the estimated parameter.

Embodiment 9

The computer-implemented method of any prior embodiment, wherein calculating the steer force and the steer angle is further based at least in part on a desired build rate and a desired turn rate.

Embodiment 10

The computer-implemented method of any prior embodiment, wherein calculating the steer force and the steer angle is based at least in part on a well plan, a geological model, or a logging while drilling measurement.

Embodiment 11

The computer-implemented method of any prior embodiment, further including determining an earth formation change based at least in part on the estimated parameter and a measured depth.

Embodiment 12

The computer-implemented method of any prior embodiment, further including calculating a prediction of a future well path.

Embodiment 13

The computer-implemented method of any prior embodiment, wherein the control action allows for observations that enable parameter estimation while not harming the wellbore operation.

Embodiment 14

A system for integrating contextual information into a workflow for a wellbore operation, the system including: a memory including computer readable instructions and a processing device for executing the computer readable instructions for performing a method, the method including: receiving, by the processing device, measurement data from the wellbore operation; performing, by the processing device, an online estimation to estimate at least one of a parameter and a state based at least in part on measurement data and based at least in part on an offline estimation; and implementing, by the processing device, a control input to control an aspect of the wellbore operation, wherein the control input is based at least in part on the estimated parameter and the estimated state.

Embodiment 15

The system of any prior embodiment, wherein the offline estimation of the at least one of the parameter and the state is based at least in part on constraints, parameters, or initial conditions generated from a machine learning technique.

Embodiment 16

The system of any prior embodiment, wherein the constraints, parameters, and initial conditions generated during offline estimation are generated using a machine learning technique.

Embodiment 17

The system of any prior embodiment, wherein the machine learning technique receives as inputs job data from a plurality of jobs and generates the constraints, parameters, and initial conditions based at least in part on the jobs data, and wherein the jobs data comprises rate of penetration data, weight on bit data, rotation per minute data, fluid pressure data, and gamma ray data.

Embodiment 18

The system of any prior embodiment, wherein the method further including calculating, by the processing device, a steer force and a steer angle based at least in part on the estimated parameter, wherein calculating the steer force and the steer angle is further based at least in part on a desired build rate and a desired turn rate.

Embodiment 19

The system of any prior embodiment, wherein the method further determining an earth formation change based at least in part on the estimated parameter and a measured depth.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure can be used in a variety of well operations. These operations can involve using one or more treatment agents to treat a formation, the fluids resident in a formation, a wellbore, and/or equipment in the wellbore, such as production tubing. The treatment agents can be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A computer-implemented method for model-based parameter or state estimation for directional drilling in a wellbore operation, the method comprising:
   receiving, by a processing device, measurement data from the wellbore operation;
   performing, by the processing device, an online estimation of at least one of an online parameter to generate an online estimated parameter and an online state to generate an online estimated state, the online estimation based at least in part on the measurement data and based at least in part on an offline estimated parameter generated during an offline estimation, wherein the online estimation uses a first model, the online estimation estimating the at least one of the online estimated parameter and the online estimated state within a first amount of time, and wherein the offline estimation uses a second model and a set of data that is larger than a set of the measurement data used in the online estimation, the offline estimation estimating the offline estimated parameter in a second amount of time that is more than the first amount of time;
   generating, by the processing device, a first control input to control an aspect in the wellbore operation based at least in part on at least one of the online estimated parameter and the online estimated state;
   executing a control action based on the first control input to control the aspect of the wellbore operation; and
   updating the first control input to provide a second control input, wherein the first amount of time is shorter than the time between the first control input and the second control input, wherein the second amount of time is longer than the time between the first control input and the second control input, and wherein the updating is responsive to a change to at least one of the online estimated parameter and the online estimated state, which is based at least in part on a change to the measurement data.

2. The computer-implemented method of claim 1, wherein the online estimation is selected from the group consisting of moving horizon estimation, extended Kalman filter estimation, and least squares estimation.

3. The computer-implemented method of claim 1, wherein performing the online estimation of the at least one of the online parameter and the online state is further based at least in part on at least one of a constraint and an initial condition generated during the offline estimation.

4. The computer-implemented method of claim 3, wherein the at least one of the constraint and the initial condition generated during the offline estimation is generated using a machine learning technique.

5. The computer-implemented method of claim 4, wherein the machine learning technique receives as inputs job data from a plurality of jobs and generates the offline estimated parameter and the at least one of the constraint and the initial condition based at least in part on the job data.

6. The computer-implemented method of claim 5, wherein the job data comprises rate of penetration data, weight on bit data, rotation per minute data, fluid pressure data, or gamma ray data.

7. The computer-implemented method of claim 1, wherein underlying models used to perform the online and offline estimations are selected from a set of wellbore operation models by minimizing an error between a measurement from wellbore operation and calculated measurements from the underlying models.

8. The computer-implemented method of claim 1, further comprising:
   calculating, by the processing device, a steer force and a steer angle based at least in part on the online estimated parameter.

9. The computer-implemented method of claim 8, wherein calculating the steer force and the steer angle is further based at least in part on a desired build rate and a desired turn rate.

10. The computer-implemented method of claim 9, wherein calculating the steer force and the steer angle is based at least in part on a well plan, a geological model, or a logging while drilling measurement.

11. The computer-implemented method of claim 1, further comprising determining an earth formation change based at least in part on the online estimated parameter or online estimated state.

12. The computer-implemented method of claim 1, further comprising calculating a prediction of a future well path.

13. The computer-implemented method of claim 1, wherein the control action allows for observations that enable parameter estimation while not harming the wellbore operation.

14. The computer-implemented method of claim 1, further comprising generating state dynamics based at least in part on the online estimated parameter.

15. The computer-implemented method of claim 1, further comprising performing accelerated parameter estimation by using a weighted average of the online estimated parameter estimated during the online estimation and the offline estimated parameter generated during the offline estimation.

16. The computer-implemented method of claim 1, wherein the online estimation uses a parameter estimator to perform the online estimation.

17. The computer-implemented method of claim 1, further comprising generating a third control input subsequent to generating the first control input and prior to updating the first control input.

18. A system to control an aspect of a workflow for a wellbore operation, the system comprising:
   a memory comprising computer readable instructions; and
   a processing device for executing the computer readable instructions for performing a method, the method comprising:
      receiving, by the processing device, measurement data from the wellbore operation;
      performing, by the processing device, an online estimation to estimate at least one of an online estimated parameter and an online estimated state based at least in part on measurement data and based at least in part on an offline estimated parameter generated during an offline estimation, wherein the online estimation uses a first model, the online estimation estimating the at least one of the online estimated parameter and the online estimated state within a first amount of time, and wherein the offline estimation uses a second model and a set of data that is larger than a set of the measurement data used in the online estimation, the offline estimation estimating the offline estimated parameter in a second amount of time that is more than the first amount of time;

implementing, by the processing device, a first control input to control an aspect of the wellbore operation, wherein the first control input is based at least in part on at least one of the online estimated parameter and the online estimated state; and updating the first control input to provide a second control input, wherein the first amount of time is shorter than the time between the first control input and the second control input, wherein the second amount of time is longer than the time between the first control input and the second control input, and wherein the updating is responsive to a change to at least one of the online estimated parameter and the online estimated state, which is based at least in part on a change to the measurement data.

19. The system of claim 18, wherein the method further comprises:

calculating, by the processing device, a steer force and a steer angle based at least in part on the online estimated parameter, wherein calculating the steer force and the steer angle is further based at least in part on a desired build rate and a desired turn rate.

20. The system of claim 18, wherein the method further determining an earth formation change based at least in part on the online estimated parameter.

21. The system of claim 18, wherein the online estimation of the at least one of the online estimated parameter and the online estimated state is based at least in part on at least one of a constraint and an initial condition generated from a machine learning technique.

22. The system of claim 21, wherein the machine learning technique receives as inputs job data from a plurality of jobs and generates the offline estimated parameter and at least one of the constraint and the initial condition based at least in part on the job data, and wherein the job data comprises at least one of rate of penetration data, weight on bit data, rotation per minute data, fluid pressure data, and gamma ray data.

23. The system of claim 18, wherein the method further comprises generating a third control input subsequent to generating the first control input and prior to updating the first control input.

* * * * *